June 24, 1969     W. J. CHORKEY     3,451,422
CHECK VALVE
Original Filed March 29, 1963     Sheet 1 of 2
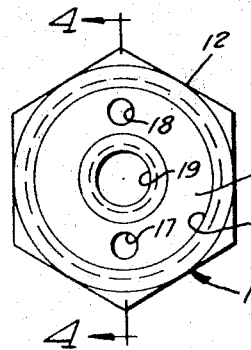
Fig.1
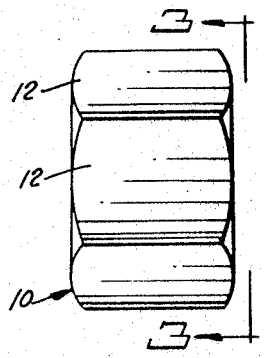
Fig.2
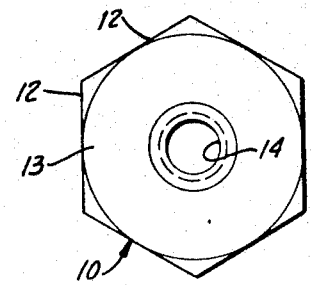
Fig.3
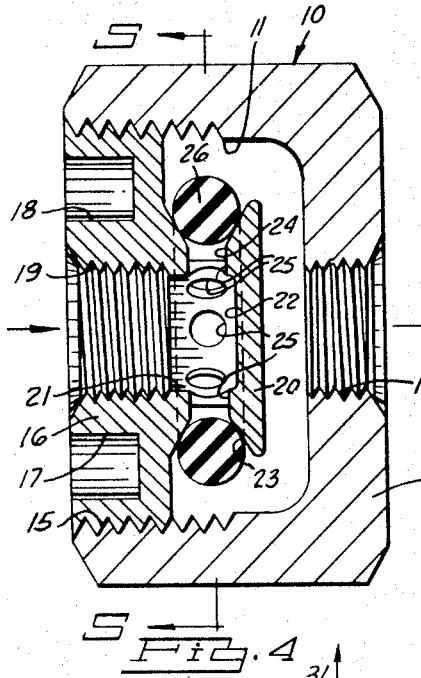
Fig.4
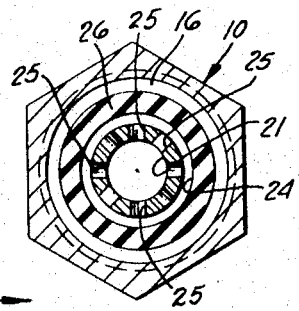
Fig.5
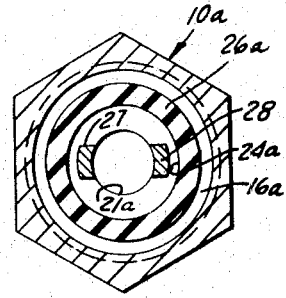
Fig.6
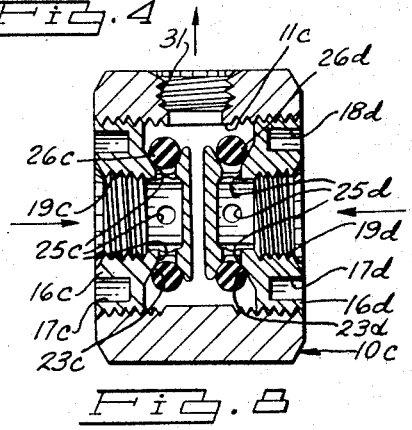
Fig.8
Fig.7
INVENTOR.
WILLIAM J. CHORKEY
BY Donnelly, Maentz & Harrington
ATTORNEYS June 24, 1969 — W. J. CHORKEY — 3,451,422

CHECK VALVE

Original Filed March 29, 1963 — Sheet 2 of 2

INVENTOR.
WILLIAM J. CHORKEY
BY Donnelly, Mentag & Harrington
ATTORNEYS

United States Patent Office 3,451,422
Patented June 24, 1969

3,451,422
CHECK VALVE
William J. Chorkey, 32331 Baintree,
Farmington, Mich. 48024
Application Mar. 29, 1964, Ser. No. 271,549, now Patent
No. 3,298,394, dated Jan. 17, 1967, which is a continuation-in-part of application Ser. No. 210,974, July 19,
1962, now abandoned. Divided and this application Dec.
16, 1966, Ser. No. 602,195
Int. Cl. F16k 15/14
U.S. Cl. 137—525         4 Claims

ABSTRACT OF THE DISCLOSURE

A check valve having an internal chamber in a valve body and a plurality of ports for admitting fluid under pressure into the chamber and exhausting the same therefrom. At least one of the ports is an inlet port having a one-way, O-ring type valve at the inner end thereof. The O-ring is expandable away from its valve seat by fluid under pressure entering said inlet valve to allow the fluid to flow therearound and into the chamber. One of said ports functions as an exhaust port. In one embodiment a second one of said ports is an inlet port and is disposed on an axis at an angle to the axis of the first mentioned inlet port so that when said O-ring is expanded, away from its valve seat, it is engageable with a valve seat on the second inlet port so as to close the same and block fluid flow therethrough. In another embodiment of the valve two of the ports are inlet ports which are each provided with a one-way O-ring valve.

---

This application is a division of application, Ser. No. 271,549 filed Mar. 29, 1963, and now Patent No. 3,298,-394, and a continuation in part of my prior copending application entitled, Check Valve, Ser. No. 210,974, filed July 19, 1962, now bandoned.

This invention relates generally to improvements in check valves, and more particularly to an improved check valve construction incorporating a novel combined valve and sealing means.

In the prior art check valves the sealing means employed to prevent reverse or back flow through the valve consists of a metallic ball adapted to block off or close off a passageway, or a hole, smaller than the ball, and a spring in engagement with the ball which is adapted to normally bias the ball against the passage or hole to prevent flow therethrough. A disadvantage of such prior art check valves is that the metallic ball permits bubble type leakage therearound. Accordingly, it is an important object of the present invention to provide a novel and improved check valve construction incorporating an O-ring sealing means which is adapted to prevent leakage back through the valve, including bubble type leakage normally encountered in the prior art check valves.

It is another object of the present invention to provide a check valve construction which incorporates an O-ring that functions as a sealing means as well as a valve. The O-ring is adapted to expand to allow fluid flow through the check valve in one direction only, and to function as a sealing means when the fluid attempts to flow in the reverse or back direction.

It is a further object of the present invention to provide a novel and improved check valve construction which may be incorporated in valves capable of performing functions other than a sole checking function as, for example, a shuttle valve function or a multiple check valve function.

It is still another object of the present invention to provide a novel and improved check valve which is simple and compact in construction, economical of manufacture, efficient in operation, easy to maintain, and which has optimum characteristics of durability and accuracy of operation.

Other objects, features and advantages of this invention will be apparent from the following detailed description and appended claims, reference being had to the accompanying drawing forming a part of the specification wherein like reference numerals designate corresponding parts of the several views.

In the drawings:

FIG. 1 is a full size end view of a check valve made in accordance with the principles of the present invention, and showing and inlet end thereof;

FIG. 2 is a right side elevational view of the check valve structure shown in FIG. 1;

FIG. 3 is an end elevational view of the valve structure shown in FIG. 2, taken along the line 3—3 thereof, looking in the direction of the arrows, and showing the outlet end of the check valve;

FIG. 4 is an enlarged elevational sectional view of the check valve structure illustrated in FIG. 1, taken along the line 4—4 thereof and looking in the direction of the arrows;

FIG. 5 is a reduced elevational sectional view of the structure illustrated in FIG. 4, taken along the line 5—5 thereof and looking in the direction of the arrows;

FIG. 6 is a reduced elevational sectional view similar to FIG. 5 and showing a slight modification of the check valve structure of FIGS. 1 through 5;

FIG. 7 is an elevational sectional view of a second embodiment of the invention, similar to the elevational sectional view of FIG. 4, and showing the model check valve structure of the present invention incorporated in a valve adapted to produce a quick exhaust function or a shuttle valve function;

FIG. 8 is an elevational sectional view, similar to the elevational sectional view of FIG. 4, and showing a third embodiment of the check valve structure of the present invention incorporated in a multiple check valve;

Figure 12:
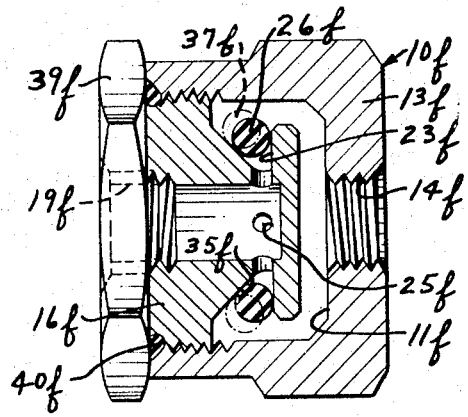
Figure 13:
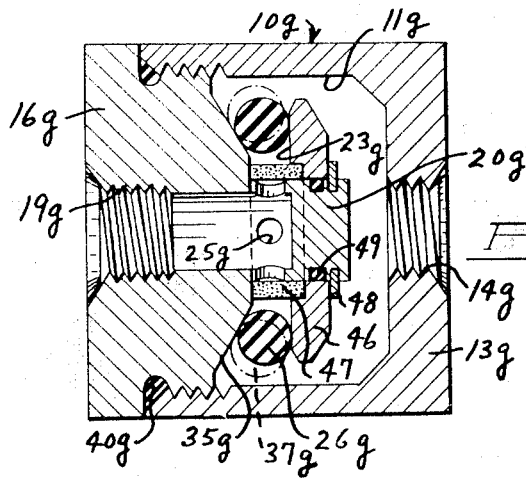

FIG. 12 is an elevational sectional view of another embodiment of the invention, similar to the elevational sectional view of FIG. 4, and showing a slightly modified valve seat construction; and, FIG. 13 is still another elevational sectional view of a further embodiment of the invention, similar to the elevational sectional view of FIG. 4, and showing a modified valve seat construction including a filter ring.

Referring now to the drawing and in particular to FIGS. 1 through 5, the numeral 10 generally indicates the valve body or housing which is provided with the valve chamber 11. The outer surface of the housing 10 is provided with a plurality of flat surfaces indicated by the numeral 12 so as form surfaces engageable by a suitable wrench when connecting the valve in a fluid system. As show in FIG. 4, one end of the chamber 11 is enclosed by the end wall 13. The end wall 13 is provided with a central threaded outlet port 14, as shown in FIGS. 3 and 4.

As shown in FIG. 4, the end of the valve body 10 opposite to the end wall 13 is open as indicated by the numeral 15. The body open end 15 is threaded and adapted to threadably receive the annular end plate 16 which is adapted to be threaded into place in the body 10 by means of a suitable wrench engaged in the wrench holes 17 and 18. The end plate 16 is provided with the central inlet port 19 which is threaded as shown in FIG. 4.

As shown in FIG. 4, the annular end plate 16 is provided with the inwardly extended reduced annular extension 20. A passageway 21 is formed in the extension 20 and communicates with the inlet port 19 and extends inwardly to the point indicated by the numeral 22. Formed around the annular extension 20 is the annular V-shaped valve seat 23 which terminates at its inner end in the annular groove 24. As shown in FIGS. 4 and 5, the passage 21 is connected to the annular valve groove 24 by means of a plurality of radially disposed ports or openings 25. It will be seen that fluid entering the port 19 will flow through the passage 21 and through the ports 25 into the annular valve groove 24. The fluid is prevented from passing freely into the chamber 11 by means of the valve member 26 which comprises an O-ring. The O-ring 26 may be made from any suitable elastic material as, for example, it may be formed from the same rubber material as the conventional commerciallly available type O-rings are made from. When the check valve of the present invention is connected in a system before the fluid is admitted thereto, the sealing O-ring 26 is adapted to be seated on the valve seat 23 in a tensioned condition wherein the O-ring 26 is seated on the valve seat 23 in a sealing engagement therewith. It will be seen that the valve member 26 functions as a valve and as a sealing means.

In the use of a check valve made in accordance with the embodiment of FIGS. 1 through 5, the valve would be connected in a fluid flow system so that the fluid under pressure would enter the inlet port 19 and pass through the passageway 21 and into the ports 25 through the annular groove 24. The fluid under pressure then engages the inside diameter of the O-ring 26 thereby causing it to expand or dilate so as to permit the fluid to flow around the O-ring 26 and into the chamber 11. The fluid under pressure then passes from the chamber 11 out through the outlet port 14. It will be seen that when the fluid entering the valve is shut off by means of a suitable control valve, that the fluid under pressure in the chamber 11 will flow back to the outside diameter of the O-ring 26 and assist the natural compression function of the O-ring 26 so as to prevent reverse or back flow through the outlet port 14 to the inlet port 19 thereby providing a check valve function.

FIG. 6 is a reduced elevational, sectional view similar to FIG. 5 and showing a slight modification of the check valve structure of FIGS. 1 through 5. The structure of the embodiment of FIG. 6 which is the same as that of the first embodiment of FIGS. 1 through 5 is indicated by the same reference numerals followed by the small letter $a$. The only structural difference between the embodiment of FIG. 6 and the embodiment of FIGS. 1 through 5 is that the reduced annular extension 20 is connected to the plate 16 by the two axially extended arms 27 and 28 instead of the annular member shown in FIG. 5 and which is provided with a plurality of ports 25. In the embodiment of FIG. 6, the fluid entering the passage 21$a$ flows past the two arms 27 and 28 and into the annular space 24$a$ and then into engagement with the O-ring 26$a$. The modified embodiment of FIG. 6 functions in the same manner as the embodiment of FIGS. 1 through 5.

FIG. 7 is an elevational, sectional view of another embodiment of this invention. FIG. 7 shows a sectional view similar to FIG. 4. The embodiment of FIG. 7 shows the check valve structure of the present invention incorporated in a valve adapted to provide a quick exhaust function or a shuttle valve function. The structure of the embodiment of FIG. 7 which is identical to the structure shown in FIG. 4 is indicated by the same reference numerals followed by the small letter $b$. The valve shown in FIG. 7 would be connected in a fluid pressure supply system with the inlet port 19$b$ being connected to the source of fluid pressure and the outlet port 14$b$ being connected to the device being supplied with fluid pressure as, for example, one end of a fluid cylinder. The third port 29 is formed through the outer wall of the valve housing and communicates with the chamber 11$b$. The port 29 would function as an exhaust or outlet port. As shown in FIG. 7, the exhaust port 29 is provided with the annular tapered valve seat 30, at the inner end thereof, at the point at which this port communicates with the chamber 11$b$.

In use, when fluid under pressure is admitted to the valve through the inlet port 19$b$, the fluid will flow through the ports 25$b$ and into engagement with the inside diameter of the O-ring 26$b$ thereby causing it to extend or dilate to a larger diameter. When the O-ring 26$b$ is thus enlarged, it will engage the valve seat 30 and close off the exhaust port 29 and simultaneously permit the fluid under pressure to flow into the chamber 11$b$, and thence through the outlet port 14$b$.

When the incoming fluid under pressure is cut off, the fluid returning through the port 14$b$ from the working source will flow freely through the chamber 11$b$ and out of the exhaust port 29 to the atmosphere. The natural compression of the O-ring 26$b$ plus the pressure of the returning fluid will block off the inlet port 19$b$. Prevention of reverse flow in all modifications of the invention is assisted by the reverse pressure which will press in on the seal proportionately to the amount of pressure provided.

The valve shown in FIG. 7 may also be used as a shuttle valve wherein the port 19$b$ is connected to a first source of pressurized fluid, and the port 29 is connected to a second source of pressurized fluid. The outlet port 14$b$ would be connected to the device which is to be controlled by the pressurized fluid, as for example, a fluid cylinder. The purpose of such a shuttle valve arrangement is to permit two pressure inlet sources and only one outlet source. Furthermore, such a shuttle valve arrangement may be adapted to control a working source by means of an automatic system connected to one of the inlet ports and in case of failure of the automatic system, the second inlet port of the shuttle valve could be connected to a manually operated piston for emergency control of the working source.

FIG. 8 is an elevational, sectional view, similar to the sectional view of FIG. 4, and showing a further embodiment of the check valve structure of the present invention incorporated in a multiple check valve. The check valve structure of FIG. 8, which is similar to that of FIG. 4, is indicated by the same reference numerals followed by the small letter $c$. In the embodiment of FIG. 8, the valve body 10$c$ has the end wall and outlet port 14 removed and replaced by a second O-ring valve structure and the parts thereof are indicated by the same reference numerals as used for the valve structure of FIG. 4, followed by the small letter $d$. The valve housing 10$c$ is provided with the outlet port 31 which is formed through the housing 10$c$ and which communicates with the chamber 11$c$. It will be seen that the valve of FIG. 8 thus includes two O-ring check valves which are disposed in axial alignment with each other and which provide two inlets to the chamber 11$c$.

The multiple check valve of FIG. 8 permits control over two pressure sources for admitting flow into the chamber 11$c$ and out through the single outlet 31. The valve of FIG. 8 permits fluid under pressure to enter the inlet port 19$c$ and to pass into the chamber 11$c$ and out through the outlet port 31. During such period, the sealing ring 26$d$ seals off the inlet port 19$d$. After a predetermined amount of flow into the valve through the inlet port 19$c$, the procedure can be reversed to permit fluid to flow into the chamber 11c by means of the inlet port 19d with resultant sealing of the inlet port 19c by the O-ring 26c. The aforegoing procedure would be followed in many industrial processess, as for example, when mixing two elements to form a finished product.

Figure 9:
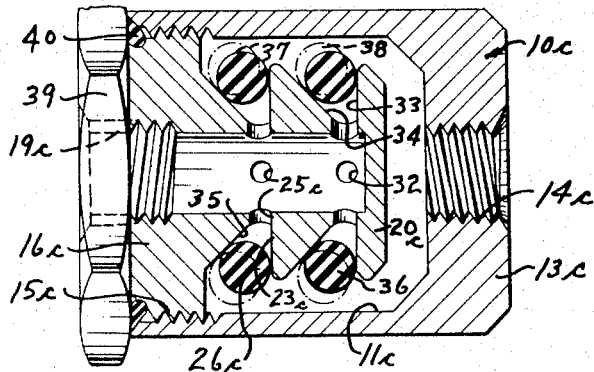
FIG. 9 is a longitudinal elevational view of a fourth embodiment of the invention, similar to the elevational sectional view of FIG. 4, and showing a check valve incorporating a plurality of O-rings.

FIG. 9 is an elevational, sectional view of a further embodiment of the invention. FIG. 9 shows a sectional view similar to FIG. 4. FIG. 9 illustrates how the principles of the present invention may be incorporated in a check valve adapted to pass a greater volume of fluid by employing a plurality of sealing rings. The structure of the embodiment of FIG. 9, which is identical to the structure shown in FIG. 4, is illustrated by the same reference numerals followed by the small letter c.

The check valve of FIG. 9 differs from the check valve of FIG. 4 in that it provides for a plurality of sealing rings mounted on the annular end plate extension 20c. FIG. 9 shows a pair of O-ring valve members but it will be understood that more than two such valve members may be employed if desired. FIG. 9 shows a second set of openings or ports 32 around which is formed the valve seat 33. One side of the valve seat or annular groove is provided with a vertical wall and the other side is provided with the outwardly sloping wall 34. The surface of wall 34 tapers at an approximate 45° angle. It will be seen that the valve ring seat or groove 23c is also similarly shaped and is provided with the tapered or sloping valve seat wall 35. The O-ring sealing means 26c and 36 are made from the same material as the sealing rings in the previously described embodiments. It will be seen that when the fluid under pressure enters the inlet port 19c, it will pass through the ports 25c and 32 and during an unseating operation, it will move the sealing rings 26c and 36 outwardly along the sloping surface 34 and 35. The end plate 16c is provided with an enlarged head 39 for engagement with a suitable wrench or the like for turning the end plate 16c into the body 10c. A plurality of flat surfaces are formed around the outer circumference of the head 39. A suitable sealing ring 40 is operatively mounted between the head 39 and the body 10c. The embodiment of FIG. 9 permits a greater flow of fluid to be passed in less opening time in an equivalent single O-ring check valve. A valve of the construction of FIG. 9 will open at a lower pressure than the single O-ring equivalent to the two O-rings of FIG. 9 and thus the embodiment of FIG. 9 permits a greater volume of fluid to be passed in a minimum of time.

Figure 10:
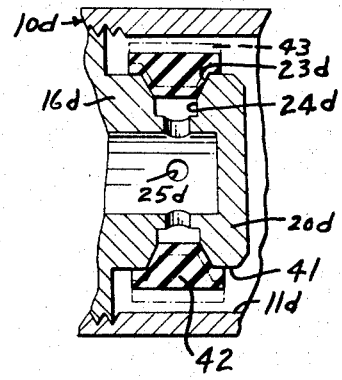
FIG. 10 is a fragmentary elevational sectional view of a fifth embodiment of the invention, similar to the elevational sectional view of FIG. 4, and showing a T-shaped sealing ring employed in the invention.

FIG. 10 is a fragmentary, elevational, sectional view of a further embodiment of the invention. FIG. 10 is a sectional view similar to FIG. 4. The structure of the embodiment of FIG. 10 which is the same as that of the first embodiment of FIGS. 1 through 5 is indicated by the same reference numerals followed by the small letter d. The only structural difference between the embodiment of FIG. 10 and the embodiment of FIG. 4, is that the sealing ring 42 is provided with a substantially T-shaped cross section. The legs of the T are tapered inwardly and downwardly so as to converge and seat on the V-shaped valve seat 23d. The shoulders of the T-shaped sealing ring 42 are adapted to seat on the cylindrical periphery 41 of the reduced annular end plate extension 20d. The embodiment of FIG. 10 functions in the same manner as the embodiment of FIG. 4 and the sealing ring 42 is expanded to the dotted line position indicated by the numeral 43 during operation of the check valve. The T-shaped sealing ring 42 provides a check valve construction adapted to withstand extreme back pressure and to prevent extrusion of the sealing ring into the annular groove 24d under high reverse pressures.

Figure 11:
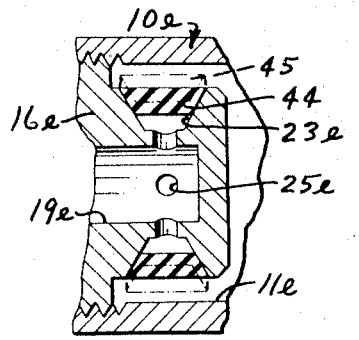
FIG. 11 is a fragmentary elevational sectional view of a sixth embodiment of the invention, similar to the elevational sectional view of FIG. 4, and showing a V-shaped sealing ring employed in the invention.

FIG. 11 is a fragmentary, elevational, sectional view similar to FIG. 4 and showing a further modification of the check valve structure of FIGS. 1 through 5. The structure of the embodiment of FIG. 11 which is the same as that of the first embodiment of FIGS. 1 through 5 is indicated by the same reference numerals followed by the small letter e. The only structural difference between the embodiment of FIG. 4 is that the sealing ring 44 is formed with a substantially V-shaped cross section. The embodiment of FIG. 11 functions in the same manner as described hereinbefore for the embodiment of FIG. 4. During operation of the valve of FIG. 11, the sealing ring 44 is expanded outwardly to a dotted position substantially as indicated by the numeral 45. The sealing ring 44 is adapted to withstand high back pressures and prevent extrusion of the sealing ring into the ports 25e.

FIG. 12 is an elevational, section view of still another embodiment of the invention. FIG. 12 is a sectional view similar to FIG. 4 and showing a single sealing ring having a single angled side and a straight side in the valve seat construction similar to the structure of FIG. 9. The structure of FIG. 12 which is the same as that of FIG. 9 is indicated with the same reference numerals followed by the small letter f. The only structural difference between the FIGS. 9 and 10 is that only one O-ring sealing member 26f is employed. As in the operation of the sealing rings of the structure of FIG. 9, the dilating or expanding sealing ring 26f moves up the angled side 35f of the valve seat to permit fluid to flow past the sealing ring 26f along the vertical side of the valve seat 23f. The structure of FIG. 12 provides a substantial lever action in which one side of the sealing ring 26f is always in engagement with the angled side of valve seat 23. The sealing or closing of the valve is thus effected by engagement of the sealing ring 26f against the vertical side of the valve seat 23f. The structure of FIG. 12 is adapted to hold a high back pressure and yet open at lower pressure as compared to the V-shaped valve seat of FIG. 4. The valve structure of FIG. 12 also includes the hexagonal head 39f on the retainer 16f.

FIG. 13 is an elevational, sectional view of a further embodiment of the invention. FIG. 13 shows a sectional view similar to FIG. 4. The structure of FIG. 13 which is the same as that of the embodiment of FIG. 4 is indicated by the same reference numerals followed by the small letter g. In this embodiment the reduced inner end of the end plate or retainer 16g is provided with the detachably mounted disc 46 which functions to form the vertical side of the valve seat 23g and to hold the centered bronze metal filter 47 in place around the ports 25g. The valve seat 23g is also provided with one angled side 35g as in the embodiment of FIG. 9. The sealing ring 26g functions in the same manner as the sealing ring of the embodiments of FIGS. 9 and 12. The disc 46 is retained in place by any suitable means as by means of the conventional retainer clip 48. A sealing ring 49 is seated between the periphery of the axial hole through the disc 46 so as to provide a sealing engagement with the annular reduced end 20g. The metal filter 47 functions to filter the fluid in the free-flow direction and to prevent extrusion of the dilating seal 26g in the opposite direction so that the valve will withstand higher back pressures. Under high back pressures, the sealing ring 26g would engage the filter 47 and be prevented from further inward movement by the fluid pressure.

It will be seen that a check valve of the present invention may be provided with any combination of the dilating seals illustrated herein and that the valve may be provided with a retainer or end plate as shown in FIG. 4 or 9. The filtering metal ring 47 of FIG. 13 may also be employed in any of the check valves made in accordance with the principles of the present invention.

While it will be apparent that the preferred embodiments of the invention herein disclosed are well calculated to fulfill the objects above stated, it will be appreciated that the invention is susceptible to modification, variation and change without departing from the proper scope of fair meaning of the subjoined claims.

What I claim is:

1. A valve comprising: a body having a chamber; said body being provided with three ports for admitting fluid under pressure into said chamber and exhausting the same therefrom; one of said ports being a continuously open exhaust port; two of said ports being inlet ports having a one-way valve at the inner ends thereof; each of said one-way valves including an annular grooved valve seat and an O-ring mounted around said valve seat and being normally in sealing engagement therewith; and, said O-ring being expandable away from the valve seat by fluid under pressure entering the respective inlet port to allow the fluid to flow therearound and into said chamber.

2. A valve comprising: a body having a chamber; said body being provided with a plurality of ports for admitting fluid under pressure into said chamber and exhausting the same therefrom; at least one of said ports being an inlet port disposed on a first axis and having a one-way valve at the inner end thereof; said one-way valve including an annular grooved valve seat and an O-ring mounted around said valve seat and being normally in sealing engagement therewith; said O-ring being expandable away from the valve seat by fluid under pressure entering said inlet port to allow the fluid to flow therearound and into said chamber; a second one of said ports being disposed on a second axis at an angle to said first axis and provided at the inner end thereof with a valve seat; and, said O-ring when expanded away from the valve seat of said one-way valve being engageable with the valve seat of said second one of said ports to close the same and block fluid flow therethrough.

3. A valve comprising: a body having a chamber; one end of said body being closed and the other end being open; said body being provided with a plurality of ports for admitting fluid under pressure into said chamber and exhausting the same therefrom; one of said ports being formed through said closed end of the body; a plate detachably mounted in said body open end for enclosing the same; at least one of said ports being an inlet port formed through said plate on a first axis and having a one-way valve at the inner end thereof; said one-way valve including an annular grooved valve seat and an O-ring mounted around said valve seat and being normally in sealing engagement therewith; said O-ring being expandable away from the valve seat by fluid under pressure entering said inlet port to allow the fluid to flow therearound and into said chamber; a third one of said ports being formed through said body and provided at the inner end thereof with a valve seat; and, said O-ring when expanded away from the valve seat of said one-way valve being engageable with the valve seat of said third one of said ports to close the same and block fluid flow therethrough.

4. A valve comprising: a body having a chamber; said body being open at opposite ends thereof and provided with at least three ports for admitting fluid under pressure into said chamber and exhausting the same therefrom; one of said ports being a continuously open exhaust port; a plate detachably mounted in each of the body open ends to enclose the same; at least two of said ports being inlet ports having a one-way valve at the inner ends thereof; each of said inlet ports being formed through one of said plates; each of said one-way valves including an annular grooved valve seat and an O-ring mounted around said valve seat and being normally in sealing engagement therewith; and, said O-ring being expandable away from the valve seat by fluid under pressure entering the respective inlet port to allow the fluid to flow therearound and into said chamber.

References Cited

UNITED STATES PATENTS

| 1,366,151 | 1/1921 | Astrom | 137—525 |
| 1,734,292 | 11/1929 | Gonzalez | 137—512 X |
| 2,919,652 | 1/1960 | Fay | 137—512 X |
| 3,065,761 | 11/1962 | Peras | 137—102 |

NATHAN L. MINTZ, *Primary Examiner.*